(12) United States Patent
Tadano et al.

(10) Patent No.: US 9,273,655 B2
(45) Date of Patent: Mar. 1, 2016

(54) SEALING DEVICE

(71) Applicant: NOK CORPORATION, Tokyo (JP)

(72) Inventors: Hikaru Tadano, Kitaibaraki (JP);
Yosuke Kondo, Kitaibaraki (JP);
Hiroaki Monma, Kitaibaraki (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 14/429,478

(22) PCT Filed: Sep. 24, 2013

(86) PCT No.: PCT/JP2013/075723
§ 371 (c)(1),
(2) Date: Mar. 19, 2015

(87) PCT Pub. No.: WO2014/046288
PCT Pub. Date: Mar. 27, 2014

(65) Prior Publication Data
US 2015/0233331 A1   Aug. 20, 2015

(30) Foreign Application Priority Data
Sep. 21, 2012 (JP) ................................ 2012-207808

(51) Int. Cl.
F16J 15/00 (2006.01)
F02M 55/00 (2006.01)
F16J 15/02 (2006.01)

(52) U.S. Cl.
CPC ............ F02M 55/004 (2013.01); F16J 15/021 (2013.01)

(58) Field of Classification Search
CPC ......... F16J 15/18; F16J 15/181; F16J 15/184; F16J 15/187
See application file for complete search history.

(56) References Cited

U.S. PATENT DOCUMENTS

| 2,713,522 | A | * | 7/1955 | Petch ............................... 384/16 |
| 3,218,087 | A | * | 11/1965 | Hallesy .......................... 277/532 |
| 4,270,440 | A | | 6/1981 | Lewis, II |
| 4,327,923 | A | * | 5/1982 | Chesterton et al. ............ 277/531 |
| 4,457,369 | A | * | 7/1984 | Henderson ..................... 166/125 |
| 4,771,832 | A | * | 9/1988 | Bridges .......................... 166/380 |
| 8,814,139 | B2 | * | 8/2014 | Griffin et al. .................. 251/214 |

(Continued)

FOREIGN PATENT DOCUMENTS

| JP | 2004-019642 | 1/2004 |
| JP | 3830896 B2 | 10/2006 |
| JP | 2007-146946 | 6/2007 |
| JP | 4193498 B2 | 12/2008 |

(Continued)

OTHER PUBLICATIONS

Chinese Office Action dated Nov. 4, 2015.

Primary Examiner — Gilbert Lee
(74) Attorney, Agent, or Firm — Harness, Dickey & Pierce, P.L.C.

(57) ABSTRACT

A sealing device (100) includes a resinous sealing ring (110) and an elastomeric elastic ring (120) in an annular groove 210. The sealing ring (110) has a cylindrical surface portion (112a) making intimate contact with a groove bottom of the annular groove (210) and an inclined surface portion (112b) expanding in diameter toward the atmosphere side (A). The elastic ring (120) is disposed such that at least its portion is compressed between the inclined surface portion (112b) and the groove bottom of the annular groove (210) so as to press a portion of the sealing ring (110) on the atmosphere side (A) toward the outer peripheral side.

2 Claims, 3 Drawing Sheets

(56) References Cited

U.S. PATENT DOCUMENTS

2004/0080115 A1 4/2004 Tsuchiya et al.
2005/0242519 A1* 11/2005 Koleilat et al. ............... 277/434

FOREIGN PATENT DOCUMENTS

| JP | 4311218 B2 | 8/2009 |
| JP | 2009-264129 A | 11/2009 |

* cited by examiner

SEALING DEVICE

CROSS-REFERENCE TO RELATED APPLICATIONS

This application is a National Stage of International Application No. PCT/JP2013/075723, filed Sep. 24, 2013 (now WO 2014/046288 A1), which claims priority to Japanese Application No. 2012-207808, filed Sep. 21, 2012. The entire disclosures of each of the above applications are incorporated herein by reference.

FIELD

The present disclosure relates to a sealing device for preventing leakage of high-pressure gas.

BACKGROUND

A sealing device is provided on a portion of a cylinder head of an engine where an injector is attached to in order to prevent high-pressure combustion gas from leaking through an annular gap between an attachment hole formed in the cylinder head and the injector. Moreover, a sealing device is similarly provided on a portion of the cylinder head where sensors and so forth are attached to. In such a sealing device, a technique that employs a resinous sealing ring that has a smaller number of components and can better suppress noise from vibration, when compared with the case of using a metal washer-like sealing, is known.

However, the resinous sealing ring has a problem that a compressing margin on an outer peripheral side decreases with time due to creep deformation and hence its sealing performance eventually deteriorates. In order to solve such a problem, techniques that employ a structure in which a self-sealing function is exerted due to the pressure of combustion gas or a structure in which a surface pressure is partially increased are known (see Patent Literatures 1, 2, and 3). Although such techniques can extend the life span to some degree, it cannot be said that those techniques can sufficiently suppress deterioration of the sealing performance due to a continuing decrease in the compression margin. In particular, countermeasures against the deterioration of the sealing performance due to a loss of compression margin and in low-temperature, low-pressure condition are not sufficient.

Moreover, a technique of suppressing deterioration of the sealing performance by providing an elastic member on an inner peripheral side of a resinous sealing ring that presses the sealing ring toward an outer peripheral side is also known (see Patent Literature 4). However, in this technique, the elastic member is directly exposed to combustion gas. It is, therefore, required to use a material having high heat resistance for the elastic member, and there is another problem that the function of the elastic member deteriorates. Accordingly, there is still room for improvement.

CITATION LIST

Patent Literature

Patent Literature 1: Japanese Patent No. 3830896
Patent Literature 2: Japanese Patent No. 4311218
Patent Literature 3: Japanese Patent No. 4193498
Patent Literature 4: Japanese Patent Application Publication No. 2009-264129

SUMMARY

Technical Problem

An object of the present disclosure is to provide a sealing device that can exert a sealing performance even when a compression margin of a resinous sealing ring has decreased with time due to creep deformation.

Solution to Problem

In order to solve the problem, the present disclosure adopts the following means.

That is, a sealing device of the present disclosure is a sealing device for sealing an annular gap between an attachment hole formed in a member that is exposed to high-pressure gas and an attachment component attached to the attachment hole, the sealing device being mounted on an annular groove formed on an outer peripheral side of the attachment component, the sealing device comprising: a resinous sealing ring provided on a pressure of the high-pressure gas receiving side in the annular groove; and an elastomeric elastic ring provided on an opposite side of the pressure of the high-pressure gas receiving side with respect to the sealing ring in the annular groove, wherein the sealing ring has, on an outer peripheral side thereof, a cylindrical surface portion making intimate contact with an inner periphery of the attachment hole, and has, on an inner peripheral side thereof, a cylindrical surface portion making intimate contact with a groove bottom of the annular groove at the pressure of the high-pressure gas receiving side and an inclined surface portion expanding in diameter toward the opposite side at the opposite side, and the elastic ring is disposed such that at least a portion thereof is compressed between the inclined surface portion and the groove bottom of the annular groove so as to press a portion of the sealing ring on the opposite side thereof toward the outer peripheral side.

According to the present disclosure, the portion of the sealing ring on its opposite side that is opposite to the pressure of the high-pressure gas receiving side, is pressed toward its outer peripheral side by the elastic ring. Accordingly, a state in which at least a portion of the sealing ring on its opposite side is in intimate contact with the inner periphery of the attachment hole is maintained even when a compression margin of the resinous sealing ring has decreased with time due to creep deformation or even when the compression margin has depleted.

Moreover, as to the sealing ring, the cylindrical surface portion on the outer peripheral side makes intimate contact with the inner periphery of the attachment hole and the cylindrical surface portion on the inner peripheral and pressure of the high-pressure gas receiving side makes intimate contact with the groove bottom of the annular groove of the attachment component. Accordingly, the elastic ring disposed on the opposite side of the pressure of the high-pressure gas receiving side with respect to the sealing ring is not exposed directly to the high-pressure gas.

Advantageous Effects of Disclosure

As described above, according to the present disclosure, a sealing performance can be exerted even when a compression margin of a resinous sealing ring has decreased with time due to creep deformation.

DRAWINGS

DESCRIPTION

Hereinafter, modes for carrying out the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described.

A sealing device according to the present disclosure is used for preventing leakage of high-pressure gas such as combustion gas. More specifically, the sealing device according to the present disclosure is used for sealing an annular gap between an attachment hole formed in a member that is exposed to the high-pressure gas and an attachment component attached to the attachment hole. In the following description, an example of a sealing device that seals an annular gap between an attachment hole formed in a cylinder head, that serves as a member that is exposed to high-pressure gas, and an injector, that serves as an attachment component attached to the attachment hole, will be described. The present disclosure can be also applied to a sealing device that seals an annular gap between an attachment hole formed in a cylinder head and a variety of sensors (for example, a combustion pressure sensor) attached to the attachment hole. Moreover, the present disclosure can also be applied to a sealing device that seals an annular gap between an attachment hole formed not only in the cylinder head but also in other members that are exposed to high-pressure gas and a variety of attachment components attached to the attachment hole.

Attachment Structure of an Injector

Figure 1:
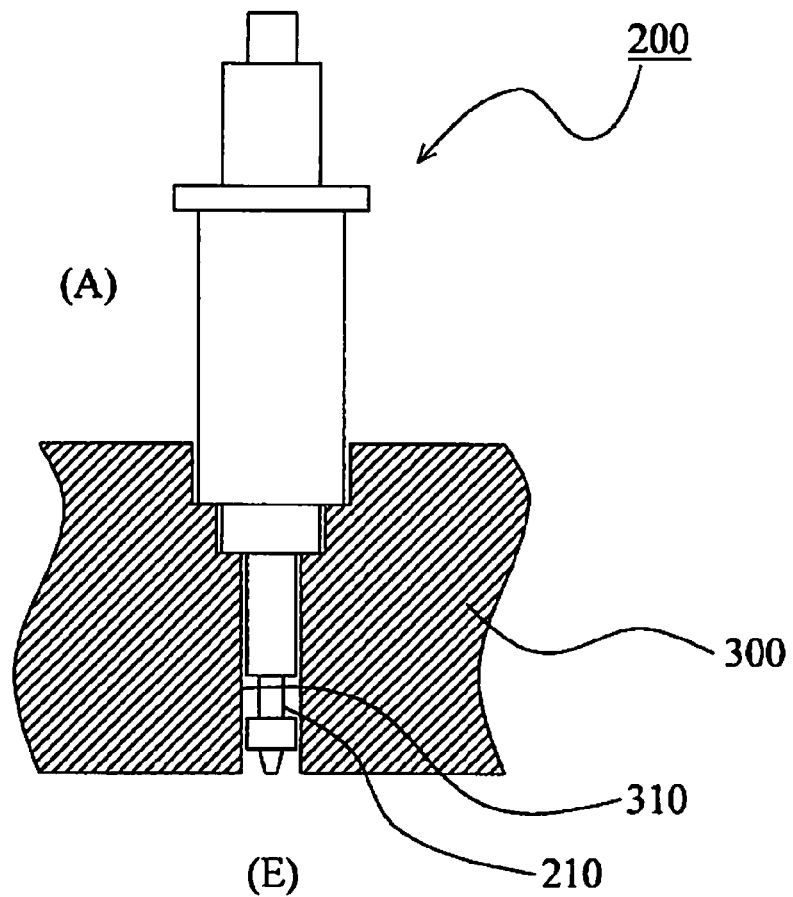
FIG. 1 is a schematic cross-sectional view illustrating an attachment structure of an injector according to an Example of the present disclosure.

Prior to describing a sealing device according to the present example, an attachment structure of an injector to which the sealing device according to the present example is applied will be described with reference to FIG. 1. In FIG. 1, the sealing device is not illustrated for the sake of convenience.

In a cylinder head 300 of an engine, an injector attachment hole 310 is formed. An injector 200 is attached so that its tip portion is inserted into the injector attachment hole 310. In the figure, a lower side separated by the cylinder head 300 is a combustion chamber side (E) and an upper side is an atmosphere side (A). Since high-pressure combustion gas is produced in the combustion chamber side (E), it is necessary to prevent the combustion gas from leaking to the atmosphere side (A) through an annular gap between the injector attachment hole 310 and the injector 200. Therefore, by forming an annular groove 210 on the tip portion of the injector 200 and mounting a sealing device (tip sealing) on the annular groove 210, the combustion gas is prevented from leaking to the atmosphere side (A) through the annular gap.

FIRST EXAMPLE

Figure 2:
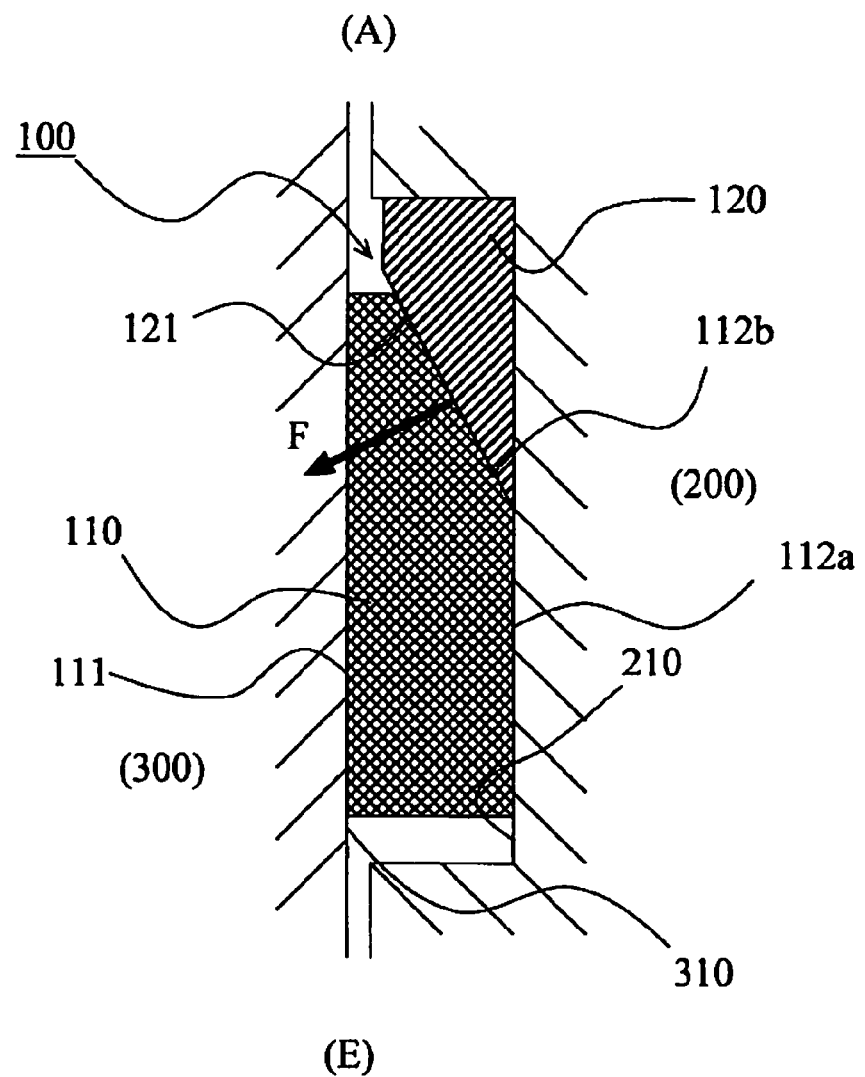
FIG. 2 is a schematic cross-sectional view illustrating an attachment state of a sealing device according to a first example of the present disclosure.

A sealing device 100 according to a first example of the present disclosure will be described with reference to FIG. 2. FIG. 2 is a schematic cross-sectional view illustrating an attachment state of the sealing device according to the first example of the present disclosure and illustrates a portion of a cross-section intersected by a plane containing a central axis of the sealing device. The sealing device 100 according to the present example has a rotationally-symmetric shape, hence it has the same cross-sectional shape on any plane containing the central axis.

The sealing device 100 according to the present example includes a resinous sealing ring 110 and an elastomeric elastic ring 120. In the annular groove, the sealing ring 110 is provided on the combustion chamber side (E) and the elastic ring 120 is provided on the atmosphere side (A). The combustion chamber side (E) is a pressure of the combustion gas (high-pressure gas) receiving side and the atmosphere side (A) is the opposite side of the pressure of the combustion gas receiving side.

The sealing ring 110 is configured from a resin material having heat resistance of at least 200 degrees Celsius (PTFE, a resin composition of PTFE and filler, and the like). An outer peripheral side of the sealing ring 110 includes a cylindrical surface 111 that makes intimate contact with an inner periphery of the injector attachment hole 310. Moreover, an inner peripheral side of the sealing ring 110 includes a cylindrical surface portion 112a that makes intimate contact with a groove bottom of the annular groove 210 at the combustion chamber side (E) and an inclined surface portion 112b that expands in diameter toward the atmosphere side (A) at the atmosphere side (A). Although the inclined surface portion 112b according to the present example is configured from a tapered surface, the inclined surface portion 112b may be configured from a curved inclined surface when seen on a cross-section. The sealing ring 110 has a compression margin at least in its initial state. Thus, the cylindrical surface 111 on the outer peripheral side and the cylindrical surface portion 112a on the inner peripheral side are in intimate contact with the inner periphery of the injector attachment hole 310 and the groove bottom of the annular groove 210, respectively, in a state in which sufficient surface pressure is maintained.

As a material of the elastic ring 120 heat-resistant rubber materials such as fluorinated rubber, acrylic rubber, HNBR and the like, for example, can be used. The elastic ring 120 according to the present example is configured from a substantially cylindrical member. More specifically, the elastic ring 120 has a structure such that an inclined surface 121 is provided on a cylindrical member on its outer peripheral and combustion chamber side (E). Accordingly, a portion of the outer periphery of the elastic ring 120 where the inclined surface 121 is not formed and an inner periphery of the elastic ring 120 are configured from a cylindrical surface.

Moreover, the inclined surface 121 of the elastic ring 120 is configured to press the inclined surface portion 112b of the sealing ring 110. More specifically, similar to the inclined surface portion 112b, the inclined surface 121 is configured from a tapered surface that expands in diameter toward the atmosphere side (A) and is configured to have a compression margin with respect to the inclined surface portion 112b. It is preferable that the taper angle of the inclined surface portion 112b and the taper angle of the inclined surface 121 are designed to be the same. In case the inclined surface portion 112b of the sealing ring 110 is configured from an inclined surface other than a tapered surface, the inclined surface 121 of the elastic ring 120 is preferably formed in the same shape as the inclined surface portion 112b.

The elastic ring 120 is disposed such that a portion on the combustion chamber side (E) where the inclined surface 121 is formed is compressed between the inclined surface portion 112b of the sealing ring 110 and the groove bottom of the annular groove 210. Therefore, the elastic ring 120 presses a portion of the sealing ring 110 on the atmosphere side (A)

toward the outer peripheral side (see arrow F in the figure). The position where the elastic ring 120 is disposed may preferably be in a region on the atmosphere side (A) from the center of the annular groove 210 in the axial direction. Moreover, the length of a portion in the axial direction on the inner peripheral side of the sealing ring 110 that makes contact with the groove bottom of the annular groove 210 may preferably be set to be equal to or more than ⅓ of the length of the annular groove 210 in the axial direction.

Advantages of Sealing Device According to Present Example

According to the sealing device 100 of the present example, the portion of the sealing ring 110 on the atmosphere side (A) is pressed toward the outer peripheral side by the elastic ring 120. Therefore, a state in which at least the portion of the sealing ring 110 on the atmosphere side (A) is in intimate contact with the inner periphery of the injector attachment hole 310 can be maintained even when the compression margin of the resinous sealing ring 110 has decreased with time due to creep deformation or even when the compression margin has depleted. Accordingly, even when the compression margin has depleted and even in a low-temperature, low-pressure state, the sealing performance can be exerted.

Moreover, in the case of the sealing device 100 according to the present example, the elastic ring 120 is pressed toward the atmosphere side (A) by the pressure of the combustion gas through the sealing ring 110. Thus, the elastic ring 120 is compressed by the sealing ring 110, the groove bottom of the annular groove 210 and the side surface on the atmosphere side (A) of the annular groove 210. Therefore, the force that presses the inclined surface portion 112b of the sealing ring 110 (see arrow F in FIG. 2) is further enhanced by the elastic resilience of the elastic ring 120. Furthermore, when the sealing ring 110 receives the pressure of the combustion gas, it is pushed toward the atmosphere side (A) with the inclined surface portion 112b sliding against the inclined surface 121 of the elastic ring 120. Therefore, the contacting force of the portion of the atmosphere side (A) of the sealing ring 110 with respect to the inner periphery of the injector attachment hole 310 is further increased. Owing to these effects, the contacting force of the portion of the sealing ring 110 on the atmosphere side (A) against the inner periphery of the injector attachment hole 310 becomes higher as the pressure of the combustion gas becomes higher.

Moreover, as for the sealing ring 110, the cylindrical surface 111 on the outer peripheral side makes intimate contact with the inner periphery of the injector attachment hole 310 and the cylindrical surface portion 112a on the inner peripheral and the combustion chamber side (E) makes intimate contact with the groove bottom of the annular groove 210 of the injector 200. Therefore, the elastic ring 120 disposed on the atmosphere side (A) with respect to the sealing ring 110 is not exposed directly to the combustion gas. Accordingly, the deterioration of the elastic ring 120 due to the combustion gas is suppressed. Moreover, while the temperature of the combustion gas is high, the elastic ring 120, unlike the sealing ring 110, does not need to have a heat resistance of 200 degrees Celsius or higher. Here, in the present example, the position where the elastic ring 120 is disposed is in the region within the annular groove 210 that is on the atmosphere side (A) from the center in the axial direction. Moreover, the length of the portion in the axial direction on the inner peripheral side of the sealing ring 110 making contact with the groove bottom of the annular groove 210 is set to be equal to or more than ⅓ of the length of the annular groove 210 in the axial direction. Accordingly, it is possible to prevent the elastic ring 120 from being exposed directly to the combustion gas more securely.

SECOND EXAMPLE

Figure 3:
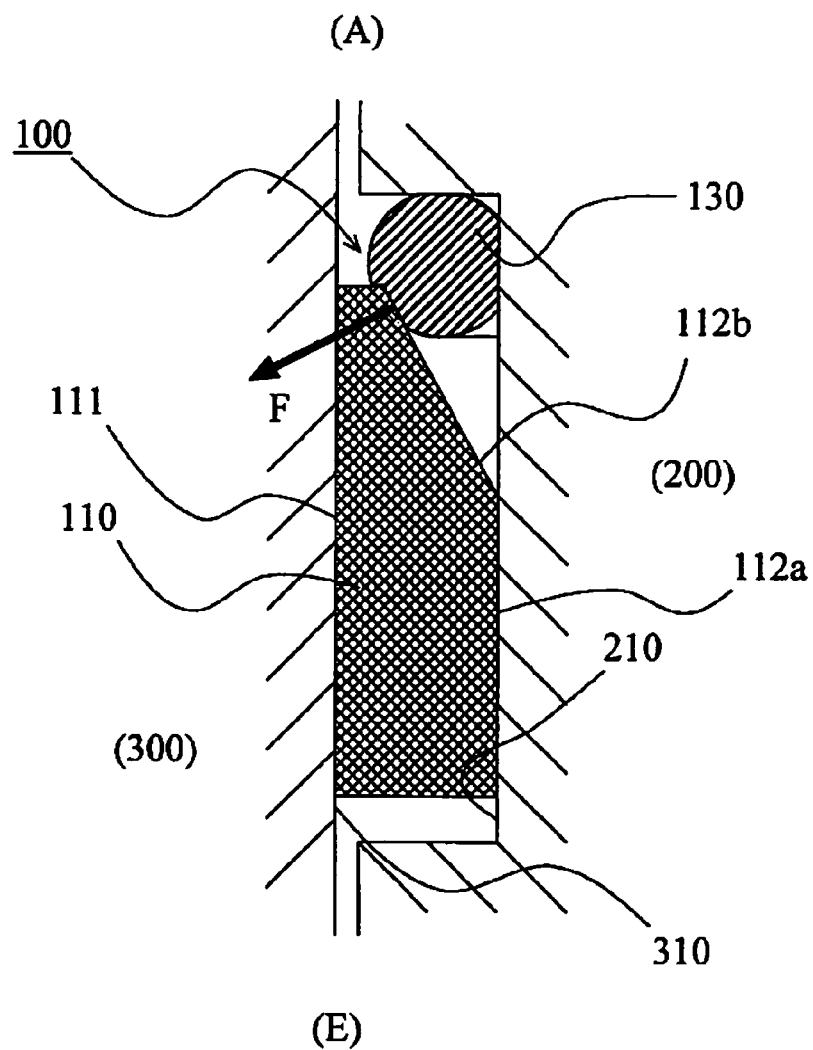
FIG. 3 is a schematic cross-sectional view illustrating an attachment state of a sealing device according to a second example of the present disclosure.

FIG. 3 illustrates a second example of the present disclosure. In the present example, a configuration in which an O-ring is employed as an elastic ring is illustrated. Since the other configurations and their functions are the same as those of the first example, the same constituent components will be denoted by the same reference numerals and description thereof will be omitted.

FIG. 3 is a schematic cross-sectional view illustrating an attachment state of the sealing device according to the second example of the present disclosure and illustrates a portion of a cross-section intersected by a plane containing a central axis of the sealing device. A sealing device 100 according to the present example has a rotationally-symmetric shape, hence it has the same cross-sectional shape on any plane containing the central axis.

Similar to the first example, the sealing device 100 according to the present example also includes a resinous sealing ring 110 and an elastomeric elastic ring 130. The sealing ring 110 has the same configuration as that of the first example, thus description thereof will be omitted. Moreover, the positional relations between the sealing ring 110 and the elastic ring 130 is the same as that of the first example.

An O-ring having a circular cross-sectional shape is used as the elastic ring 130 according to the present example. Moreover, the elastic ring 130 is configured to press the inclined surface portion 112b of the sealing ring 110. More specifically, the elastic ring 130 is disposed such that a portion thereof is compressed between the inclined surface portion 112b of the sealing ring 110 and the groove bottom of the annular groove 210. Therefore, the elastic ring 130 presses a portion of the sealing ring 110 on the atmosphere side (A) toward the outer peripheral side (see arrow F in the figure). The position where the elastic ring 130 is disposed may preferably be in a region on the atmosphere side (A) from the center of the annular groove 210 in the axial direction. Moreover, the length of a portion in the axial direction on the inner peripheral side of the sealing ring 110 making contact with the groove bottom of the annular groove 210 may preferably be set to be equal to or more than ⅓ of the length of the annular groove 210 in the axial direction.

According to the configuration described above, in the case of the sealing device 100 according to the present example, the same effects as those in the case of the first present example can be obtained. Meanwhile, in the case of the present example, when the sealing ring 110 receives the pressure of the combustion gas, the effect of the inclined surface portion 112b being pushed toward the atmosphere side (A) and against the elastic ring 130 with the inclined surface portion 112b sliding is weaker compared with the case of the first example. However, as for the elastic ring 130, there are advantages that its structure is simple and an O-ring that is a general-purpose component can be used.

REFERENCE SIGNS LIST

100: sealing device
110: sealing ring
111: cylindrical surface
112a: cylindrical surface portion
112b: inclined surface portion
120: elastic ring 121: inclined surface
130: elastic ring
200: injector
210: annular groove
300: cylinder head
310: injector attachment hole

The invention claimed is:

1. A sealing device for sealing an annular gap between an attachment hole formed in a member that is exposed to high-pressure gas in a high-pressure gas side and an attachment component attached to the attachment hole, the sealing device being mounted on an annular groove formed on an outer peripheral side of the attachment component, the sealing device comprising:

a resinous sealing ring provided on the high-pressure gas side in the annular groove; and an elastomeric elastic ring provided on an opposite side of the high-pressure gas side with respect to the sealing ring in the annular groove, wherein the sealing ring has, on an outer peripheral side thereof, a first cylindrical surface portion making intimate contact with an inner periphery of the attachment hole, and has, on an inner peripheral side thereof, a second cylindrical surface portion on the high-pressure gas side thereof and an inclined surface portion on the opposite side thereof, the second cylindrical surface portion making intimate contact with a groove bottom of the annular groove, the inclined surface portion expanding in diameter toward the opposite side, and the elastic ring is disposed such that at least a portion thereof is compressed between the inclined surface portion and the groove bottom of the annular groove so as to press a portion of the sealing ring on the opposite side thereof toward the outer peripheral side.

2. The sealing device according to claim 1, wherein the attachment hole is in a cylinder head of an internal combustion engine and the attachment component is a fuel injector that extends toward a combustion chamber of the internal combustion engine.

* * * * *